US006104911A

United States Patent [19]
Diekelman

[11] Patent Number: 6,104,911
[45] Date of Patent: Aug. 15, 2000

[54] COMMUNICATION SYSTEM WITH SATELLITE DIVERSITY AND METHOD OF OPERATION THEREOF

[75] Inventor: Dennis Paul Diekelman, Tempe, Ariz.

[73] Assignee: Motorola, Inc., Schaumburg, Ill.

[21] Appl. No.: 08/970,857

[22] Filed: Nov. 14, 1997

[51] Int. Cl.[7] .............................. H04Q 7/36; H04B 7/185
[52] U.S. Cl. ...................... 455/13.1; 455/427; 455/13.2; 455/12.1; 455/436; 455/432; 455/443; 342/354; 342/352
[58] Field of Search .................................. 455/13.1, 12.1, 455/13.2, 3.2, 427, 430, 302, 436, 439, 443, 442, 446, 448; 342/354, 352, 355

[56] References Cited

U.S. PATENT DOCUMENTS

| | | | |
|---|---|---|---|
| 5,433,726 | 7/1995 | Horstein et al. | 244/158 R |
| 5,439,190 | 8/1995 | Horstein et al. | 244/158 R |
| 5,471,641 | 11/1995 | Dosiere et al. | 455/13.1 |
| 5,590,395 | 12/1996 | Diekelman | 455/13.1 |
| 5,612,701 | 3/1997 | Diekelman | 455/12.1 |
| 5,621,415 | 4/1997 | Tuck | 342/354 |
| 5,668,556 | 9/1997 | Rouffet al. | 342/354 |
| 5,678,175 | 10/1997 | Stuart et al. | 455/13.1 |
| 5,722,042 | 2/1998 | Kimura et al. | 455/13.1 |
| 5,784,695 | 5/1996 | Upton et al. | 455/427 |
| 5,839,053 | 7/1996 | Bosch et al. | 455/13.1 |
| 5,867,783 | 8/1998 | Horstein et al. | 455/12.1 |
| 5,884,142 | 4/1997 | Wiedeman et al. | 455/12.1 |
| 5,904,837 | 9/1997 | Wiedeman | 455/13.1 |
| 5,906,337 | 10/1995 | Williams et al. | 455/13.1 |

*Primary Examiner*—Fan Tsang
*Assistant Examiner*—Simon Nguyen
*Attorney, Agent, or Firm*—Jennifer B. Wuamett; Timothy J. Lorenz

[57] ABSTRACT

A method and apparatus for providing an economically viable satellite communication system (100) for voice, data, and video using satellite diversity to augment capacity of the system, to mitigate the effects of network operational issues such as the effects of satellite failure and/or satellite blockage, and to maintain service links (180) in a cost-effective manner. Satellite diversity is incorporated into the communication architecture, along with the ability to utilize all satellites (110) within a communication range (or view) of one or more service regions (197). Management methods are used to allocate satellite diversity to enhance service and mitigate network operational issues. Satellite constellation (120) is designed to maximize the availability of satellite diversity as a resource. The method and apparatus described herein also provide a satellite communication system (100) having flexibility to adapt to changing demand and capacity requirements in various service regions (197) and to unknown or unanticipated changes in demand developing over time after the satellite communication system (100) has been deployed in whole or part.

30 Claims, 9 Drawing Sheets

COMMUNICATION SYSTEM WITH SATELLITE DIVERSITY AND METHOD OF OPERATION THEREOF

CROSS-REFERENCE TO RELATED APPLICATIONS

This application is related to the following application which is assigned to the same assignee as the present: U.S. patent application Ser. No. 08/970,773 (IRI03808) filed concurrently herewith on Nov. 14, 1997 entitled "Method and Apparatus for Sharing Spectrum Resources by Satellites Having Differing Orbital Parameters."

FIELD OF THE INVENTION

This invention relates generally to the field of satellite communication. More specifically, this invention relates to satellite communication systems and methods for allocating resources therein. In particular, this invention relates to a method and apparatus employing satellite diversity to augment system capacity, mitigate effects of satellite failure, and maintain service links in a satellite communication system.

BACKGROUND OF THE INVENTION

Within the past decade, the telecommunication industry has seen a marked increase in demand not only for globally interconnected telephone services but also for global interconnection for broadband services. The demand for such services has traditionally been met (at least in part) by some combination of terrestrial facilities, including cellular communication systems. However, attempting to satisfy the ever increasing demand for these services by adding additional terrestrial facilities would be very costly and time consuming. An alternative possible solution to satisfy the increasing demand for these services would be to employ large Geosynchronous Earth Orbit (GEO) satellites. However, this solution alone would be extremely costly, and impractical for providing service to customer terminals (whether fixed or mobile) because extremely high power would be required to communicate with satellites operating at such a high altitude.

Thus, in recent years, the industry has seen the first serious consideration of Nongeostationary Orbit (NGSO) satellite constellations using Low Earth Orbit (LEO) and/or Medium Earth Orbit (MEO) satellites and/or some combination of LEO, MEO, and/or GEO satellites to respond to the rapidly expanding demand for global telecommunication services. Such satellite communication systems have the potential to provide world-wide and/or regional coverage at a much lower cost than would be possible using a terrestrial network. Such satellite communication systems also have the potential for providing economical services to virtually any point on the earth through satellite-to-satellite and satellite-to-ground links, even to remote or sparsely populated areas where it may not be economically feasible to deploy a terrestrial network. Of various satellite communication systems that have been proposed, some propose to provide world-wide coverage, while others propose to provide regional coverage, or coverage within a particular latitude band. Among these satellite communication systems, use of satellite constellations designed with both polar and inclined orbits have been proposed.

All of these satellite communication systems must address the problem of meeting high performance standards and capacity requirements in a cost-effective manner. Meeting the demand to provide readily available, high capacity service in all coverage areas of a satellite communication system in a financially feasible manner can be extremely difficult. Several major network operational issues complicate the ability to provide cost-effective, high quality service through a satellite communication network or system.

First, various geographical service regions within the coverage area of the satellite communication system could have differing demands in terms of level of capacity required to service the area. Similarly, specific locations within a geographical service region also could have varying demands on system capacity, and these demands could vary even more by time of day (e.g., during business hours or other peak communication times). Additionally, demands from various regions and locations can change over time as certain regions become more or less populated. Designing each satellite in a satellite communication system to be flexible and capable of handling the maximum possible load from any service region or location within the coverage area would be cost prohibitive and would result in very large system components, including satellites. Satellite constellations comprised of very large satellites, and/or extremely large numbers of smaller satellites, would be financially unrealistic.

Second, satellite communication systems must address the problem of how to provide continuing service in all coverage areas in the event of a failure of one or more satellites in the satellite constellation. Even a single satellite failure likely will not be tolerated by satellite communication system users having high expectations, and such a satellite failure could have grave repercussions on the satellite communication system provider not only in terms of lost revenue, but in terms of loss of future revenues from negative effects on the reputation of the provider.

Known failure mitigation techniques include, for example, launching replacement satellites or moving spare satellites into the orbital position of the failed satellite. However these solutions are not optimal as they are very costly and can take days or even weeks to implement. Meanwhile, revenue is lost until the failed satellite is replaced.

A third problem faced by satellite communication systems is the need to dynamically maintain service links to satellite communication system users using equipment that can be situated either on or below the surface of the earth or in the atmosphere above the earth, and can be either mobile or fixed. A satellite communication system projects a number of "beams" or "cells" over the earth. A NGSO mobile satellite communication system must address the motion of satellite antenna beam coverage areas (hereinafter referred to as "satellite footprints") relative to the a communication unit (hereinafter referred to as "CU") used by a satellite communication system user to communicate through the satellite communication system. As satellites sweep over the earth's surface, a given CU may be handed-off not only between multiple beams of a single satellite, but also between two or more different satellites during the course of the communication.

Some prior art satellite communication systems accommodate satellite-to-satellite hand-offs by providing a small overlap between satellite footprints. These satellite communication systems generally provide only enough overlapping coverage to insure that hand-offs from a setting satellite (moving away from the CU) to a rising satellite (moving toward the CU) occur near the edge of a footprint. Rise and set geometry is defined by the design minimum elevation angle. This angle, when combined with the altitude of the satellite constellation, defines the size of the satellite footprint needed to cover the service area. Prior art satellite communication systems have little control over the service elevation angle at which the CU communicates with a satellite; rather, constellation dynamics and the local environment dictate the elevation angle for service link maintenance.

Other prior art satellite communication systems have used multiple satellite coverage to maintain service links during a communication and to simplify satellite-to-satellite hand-offs by having more than one satellite at time communicate with each CU using the same channel. The CU then combines all of the signals it receives from the multiple satellites to bolster the link margin and maintain the service link through hand-offs. Such a satellite communication system requires complete double satellite coverage, however, and is very costly.

A fourth network operational issue that must be addressed by satellite communication systems is the issue of service blockage due either to physical obstacles, such as buildings and trees, or weather obstacles, such as precipitation, or other similar obstacles situated within the CU's line of view to a satellite. Prior art satellite communication systems, and LEO satellite communication systems in particular have little or no resources available to mitigate the effects of blockage of access of a particular CU to the satellite communication system occurring when the line of view between the CU and a satellite is obstructed by an obstacle. This is because each CU generally views only one satellite at a time or views multiple satellites from the same elevation angle. Thus, if the line of view between the CU and a satellite is obstructed, there may be no alternative satellite with which the CU might communicate.

Thus, what is needed is a method and apparatus to manage resources in a satellite communication system so as to mitigate the effects of network operational issues. What is further needed is a method and apparatus for providing an economically viable satellite communication system for voice, data, and video using, at least in some significant part, relatively inexpensive satellites. What is further needed is a method and apparatus having flexibility to adapt to changing demand needs in regions being serviced by a satellite communication system. What is also needed is a method and apparatus for mitigating the effects of satellite failure and/or satellite blockage in a satellite communication system in a cost-effective manner. What is further needed is an improved method and apparatus for maintaining service links in a satellite communication system.

BRIEF DESCRIPTION OF THE DRAWINGS

The invention is pointed out with particularity in the appended claims. However, a more complete understanding of the present invention may be derived by referring to the detailed description and claims when considered in connection with the figures:

The exemplification set out herein illustrates a preferred embodiment of the invention in one form thereof, and such exemplification is not intended to be construed to be limiting in any manner.

DETAILED DESCRIPTION OF THE DRAWINGS

The present invention provides, among other things, a method and apparatus for providing an economically viable satellite communication system for voice, data, and video using satellite diversity to augment capacity of the system, mitigate the effects of satellite failure and/or satellite blockage, and maintain service links in a cost-effective manner. The satellite communication system of the present invention incorporates satellite diversity into the communication architecture and incorporates the ability to utilize all satellites within a communication range (or view) of one or more service regions. An advantage of the present invention is that it provides a method and apparatus for managing resources in a satellite communication system so as to mitigate the effects of various network operational issues through use of satellite diversity. Another advantage of the method and apparatus of the present invention is that it provides a satellite communication system having flexibility to adapt to changing demand and capacity requirements in various regions of the globe and in unknown or unanticipated changes in demand developing over time after the system has been deployed in whole or part.

Figure 1:
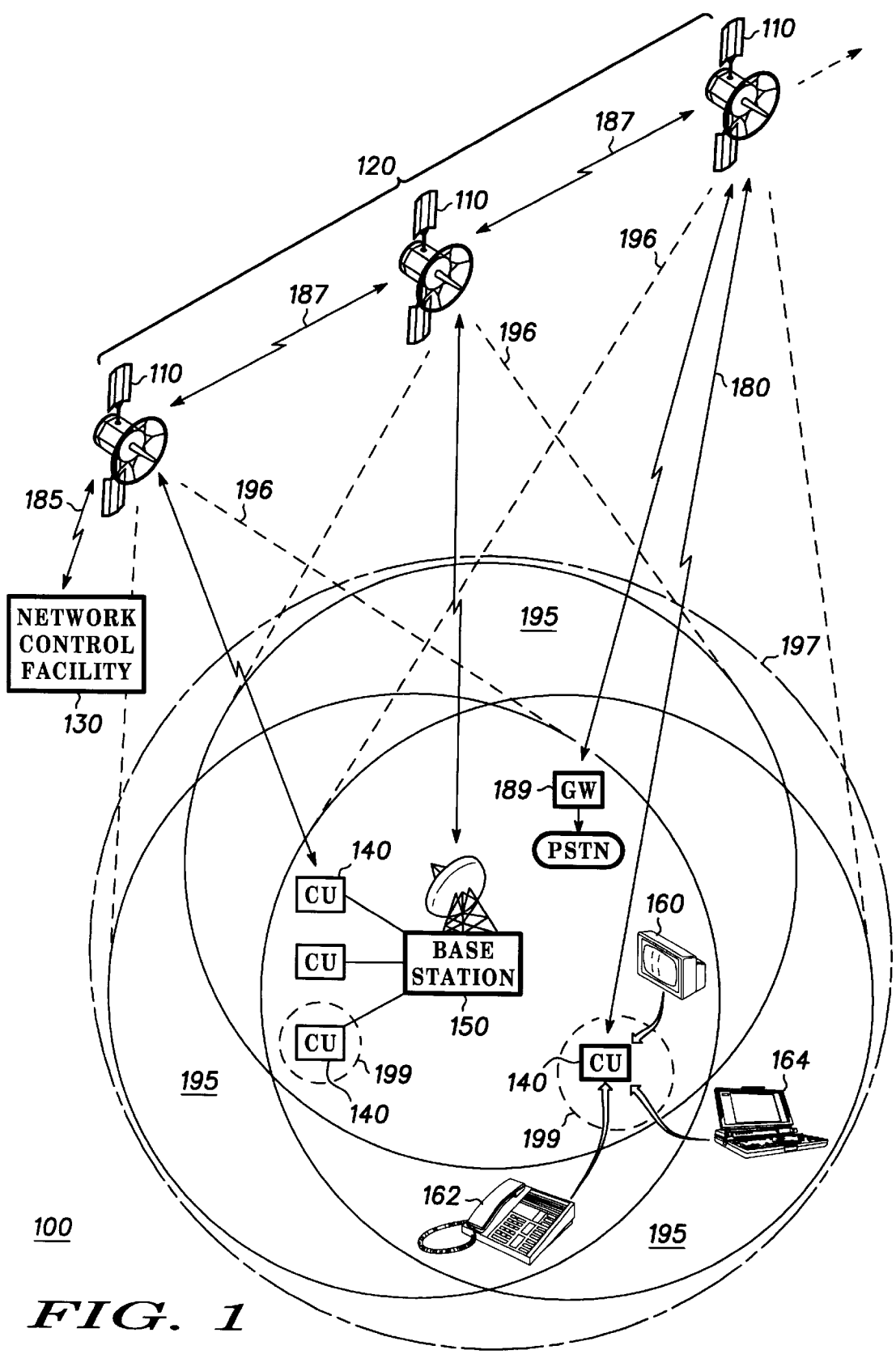
FIG. 1 illustrates a highly simplified schematic view of a portion of a satellite communication system in accordance with a preferred embodiment of the present invention.

FIG. 1 illustrates a highly simplified schematic view of a portion of a satellite communication system 100 in accordance with a preferred embodiment of the present invention. System 100 includes at least two satellites 110 which form all part of a satellite constellation 120. For clarity, FIG. 1 illustrates only three satellites 110, but in practice, satellite constellation 120 could be comprised of numerous satellites. System 100 also includes a Network Control Facility (NCF) 130 and at least one communication unit (CU) 140.

In general, satellites 110, CUs 140, and NCF 130 of communication system 100 could be viewed as a network of nodes. Each node of communication system 100 is or could be in data communication with other nodes through communication links. Additionally, all nodes of communication system 100 are, or could be, in data communication with other communication devices dispersed throughout the world through a PSTN and/or conventional terrestrial communication devices coupled to a PSTN. For clarity and ease of understanding, only one of NCF 130 and base station 150, only three of satellites 110, and only four of CUs 140 are shown. Those skilled in the art will understand, however, that additional system nodes could be desirable, depending upon the needs of the communication system.

A "satellite" is defined herein to mean a man-made object or vehicle intended to orbit a celestial body and includes both geostationary and NGSO satellites and/or combinations thereof, and including, for example, GEO satellites, LEO and/or MEO satellites, or combinations of GEO, LEO and/or MEO satellites and/or of other NGSO satellites. Thus satellites 110 could be LEO, MEO or other NGSO satellites or could be GEO satellites or some combination of some or all of the above. Similarly satellites 110 could reside in the same orbital plane or could reside in different orbital planes in satellite constellation 120 or within different layers of a multi-tiered satellite constellation (e.g., one satellite could be part of a GEO satellite constellation and another could be part of a NGSO satellite constellation or GEO and NGSO satellites could be combined in one satellite constellation). The terms "satellite constellation" and "constellation" are defined herein to mean an ensemble of satellites arranged in orbits for providing specified coverage (e.g., radio communication, photogrammetry, etc.) of portion(s) or all of earth. As used herein the terms "footprint", "satellite footprint", and "antenna beam" are not intended to be limited to any particular mode of generation. While the present invention is advantageously employed when a large number of satellites are being used in a satellite constellation, it is also applicable with as few as two satellites.

CU 140 could be located anywhere on or below the surface of the earth or in the atmosphere above the earth's surface. CU 140 preferably is a communication device capable of transmitting data and/or voice to, and receiving data and/or voice from, satellites, such as satellites 110. By way of example, CU 140 could be a computer or other device capable of sending and receiving data, e-mail messages, video signals or facsimile signals to name a few. CU 140 also could be a relatively stationary terminal located on, near or in a premises or building, such as a house or a place of business, wherein the CU can be configured to receive and/or send signals from or to one or more satellites 110. CU 140 then could forward the signals in appropriate form to one or more devices in communication with CU 140, such as for example, television 160, telephone, 162, or computer 164, or other similar device. Alternatively, CU 140 could be a hand-held cellular telephone adapted to transmit and receive communications from satellites 110 and/or from one or more NCFs such as NCF 130. In an alternative embodiment, a base station, such as base station 150 could fulfill the role of communicating with one or more satellites 110 and relaying signals, or service links 180 received from satellite 110 to CU 140. In a preferred embodiment of the present invention, CU 140 moves at negligible speeds in comparison to satellites 110.

In the exemplary configuration shown in FIG. 1, satellites 110 communicate with CUs 140 over a service link, such as service link 180 between CU 140 and satellite 110. Service link 180 typically is established after a CU requests service from system 100. How CU 140 physically transmits and receives data and/or voice from system 100 is well known to those of ordinary skill in the art. In a preferred embodiment, service link 180 uses a limited portion of the electromagnetic spectrum that is divided into numerous channels. Service link 180 preferably uses a portion of one or more frequency channels or combinations thereof.

NCF 130 also communicates with satellites 110 over link 185. NCF 130 includes processing equipment, software and other facilities to perform system or network management functions, and NCF 130 also preferably receives telemetry from satellites 110 and controls operation of satellites 110. How NCF 130 communicates with satellites 110 is well known to those of ordinary skill in the art. In a preferred embodiment, NCF 130 could be a terrestrial station made up of one of more components located anywhere on the surface of a celestial body such as earth 210 (FIG. 2) or in the atmosphere above earth 210 or dispersed throughout the system and could include more than one component. There could be multiple other NCFs (not shown) in different locations. In addition to communicating with satellites 110, NCF 130 also could communicate with CUs 140. Satellites 110 include one or more multi-beam, directional antennas (not shown) which project numerous discrete antenna beams toward the earth's surface at numerous diverse angles to form an equal number of discrete cells (not shown) within an earth-based coverage area 195 (FIG. 1) of service beam 196.

In a preferred embodiment, satellites 110 communicate with each other and/or with other nearby satellites (not shown) through inter-satellite links 187. Thus, a communication from a CU, such as CU 140, located at any point on or near the surface of the earth could be routed through satellite constellation 120 to within range of substantially any other point on the surface of the earth below the earth, or in the atmosphere above the earth. A communication could be routed down to a CU, such as CU 140, on or near the surface of the earth from satellite 110 using communication link 180.

Alternatively, satellites 110 do not communicate with each other through inter-satellite links 187, but rather a communication from a satellite to another satellite or from a CU to another CU or from an NCF 130 to one or more satellites 110 could be routed through high data rate connections down to or up from any one of many earth terminals, such as, for example, gateway terminal 189, which provides an interface to the public switched telephone network (PSTN) or other earth-based terminal.

The present invention also includes additional features which augment the capacity of system 100, facilitate the maintenance of service links, and mitigate the effects of satellite failure and of service link blockage. One of these features is the inclusion of satellite diversity in the design of satellite constellation 120. "Satellite Diversity" refers to having multiple satellites in view of the same location on the surface of the earth. Thus, more than one satellite can service the same service region, and/or area or location within a service region through service beams 196 provided by each satellite. Service beams 196 include means (such as individual antenna beams projected within an area or footprint of the service beam) to handle communication traffic to and/or from one or more CUs 140. By contrast, single coverage satellite constellations, which do not include satellite diversity, generally manage their service beams by one or more methods by which beams from different satellites virtually never service the same service region (or area or location within or outside of a service region).

In the present invention, network management methods can be used to allocate satellite diversity to enhance service and mitigate network operational issues in system 100. Satellite constellation 120 can be designed to maximize the availability of satellite diversity as a resource. Of course, satellite diversity is but one factor considered in designing and selecting a satellite constellation for use in system 100, and should be considered in light of other issues, such as estimates of regional market based demands, the type of customer equipment or CU to be used, the desired minimum service elevation angle, and space environment constraints (such as radiation and orbital debris). However, once these issues have been addressed to the satisfaction of the system designer/operator, satellite diversity and the allocation thereof can be addressed. The system of the present invention incorporates satellite diversity into the communication architecture so as to facilitate the use of satellite diversity to address network operational issues by incorporating into the system the ability to utilize all satellites within a communication range (or view) of various service regions such as service region 197, within the system coverage area, thereby enabling the communication service provider to provide quality, cost-effective service while using relatively inexpensive satellites.

Figure 2:
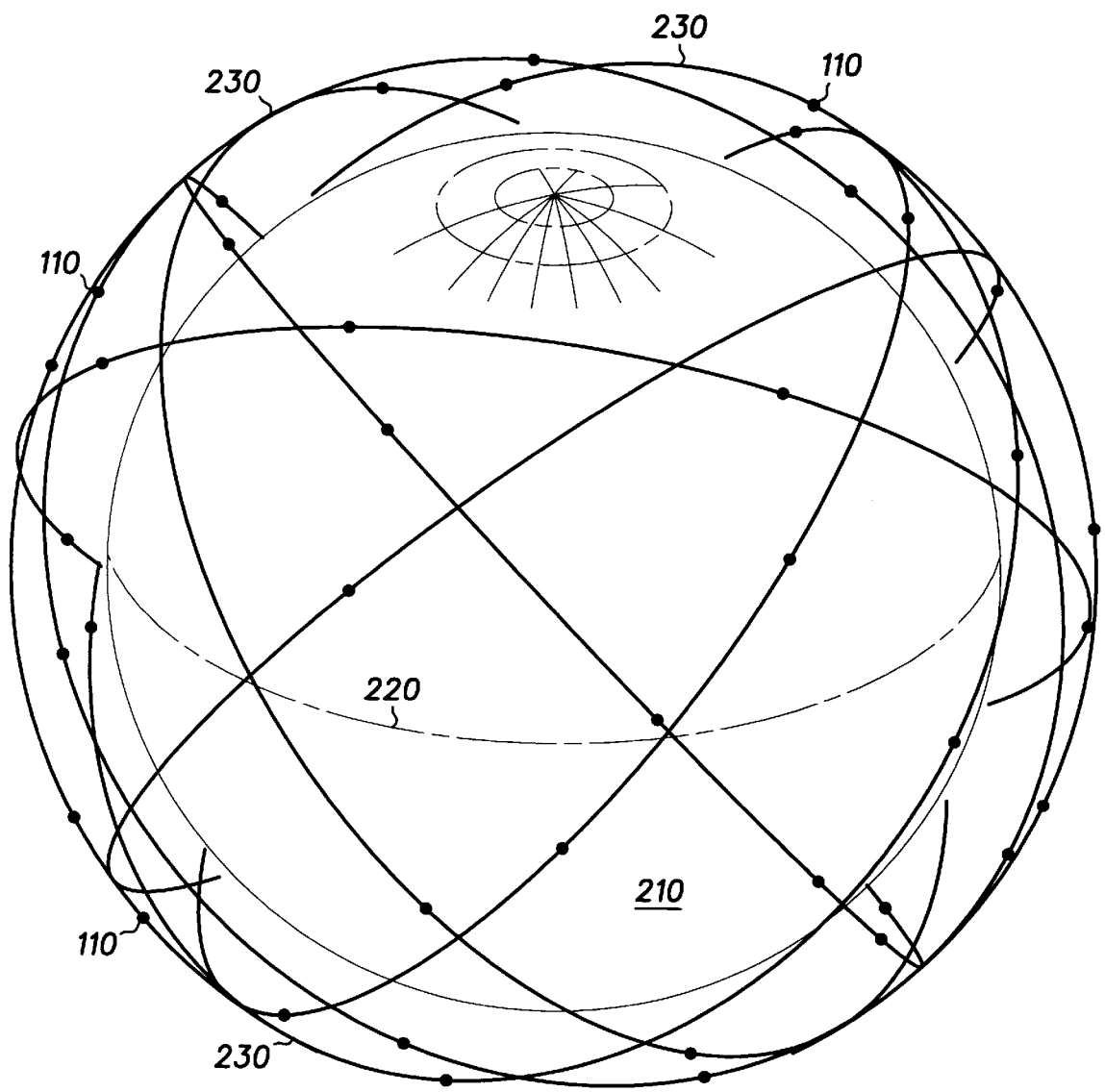
FIG. 2 illustrates a schematic view of the earth and an exemplary satellite constellation in accordance with a preferred embodiment of the present invention.

FIG. 2 illustrates a schematic view of the earth 210 and an exemplary satellite constellation 120 in accordance with a preferred embodiment of the present invention. Satellite constellation 120 is inclined at 48° with respect to the equator 220 and provides multiple levels of coverage. Satellite constellation 120 includes 63 satellites 110 which provide global coverage of earth 210. The 63 satellites are arranged in seven orbital planes 230 with nine satellites located in each orbital plane. In a preferred embodiment, satellite constellation 120 provides double coverage for Northern and Southern latitudes between 18° and 48° 99.5% of the time, and system users communicating through CUs located within this latitude range will be situated within a communication range of at least three satellites for 50% of the time or more. The satellites are evenly spaced in each orbital plane at an altitude of 1400 km. The relative phase angles between satellites in different orbital planes is 28.57°. In latitudes between 60° North and 60° South, before one satellite in the satellite constellation sets (or disappears) from a system user's view, at least one additional satellite comes into view at an elevation above an elevation angle of 16°.

Although the satellite constellation illustrated in FIG. 2 and described herein represents a preferred embodiment of the present invention, satellite constellation 120 could be comprised of numerous alternative compositions in terms of number of satellites, inclination, angle, number of orbital planes in which the satellites reside, and latitude of coverage area, to name a few factors that could very in alternate constellation compositions. For example, in an alternative embodiment of the present invention, satellite constellation 120 could include 63 satellites arranged in nine orbital planes 230 with seven satellites located in each plane (i.e., a (9×7) satellite constellation rather than the (7×9) satellite constellation described above). Similarly, virtually any other satellite constellation having as few as two satellites residing in one or two orbital planes or as many as hundreds of satellites residing in one or more orbital planes could conceivably be used without departing from the spirit of the present invention.

Figure 3:
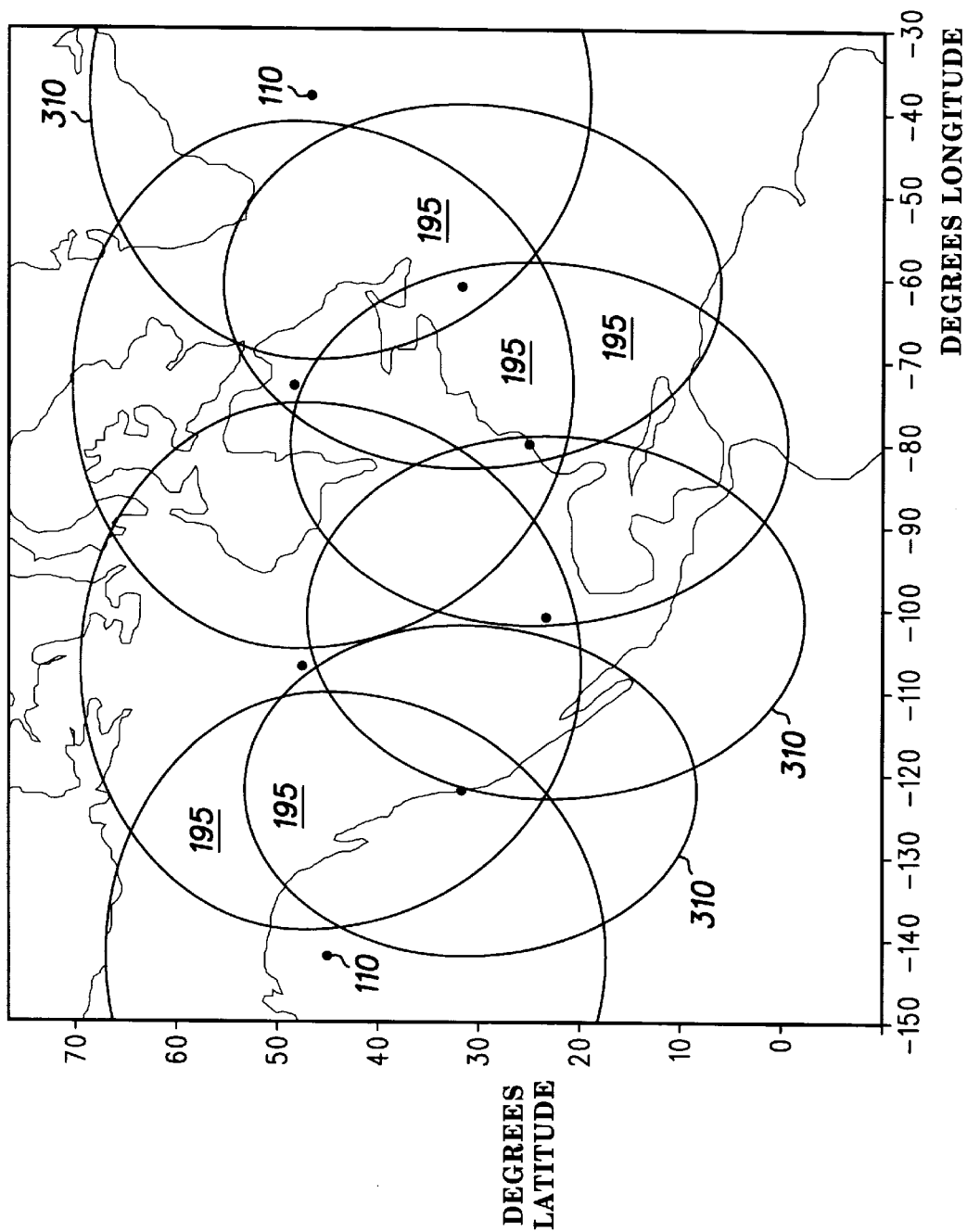
FIG. 3 illustrates an overhead view of multiple, overlapping satellite footprints of RF beams of multiple satellites providing multiple coverage areas in accordance with a preferred embodiment of the present invention.

FIG. 3 illustrates an overhead view of multiple, overlapping satellite footprints of RF beams of multiple satellites providing multiple coverage areas in accordance with a preferred embodiment of the present invention. Each satellite footprint 310 represents an earth-based coverage area of each satellite such as coverage area 195 (FIG. 1). System 100 (FIG. 1) can service one or more (and desirably numerous) earth-based service regions, such as a service region 197 (FIG. 1). In the example illustrated in FIG. 3, a service region such as service region 197 (FIG. 1) could be a portion of the United States, such as the South Western United States or could be one or more of numerous other geographical regions anywhere on or below the surface of the earth or in the atmosphere above the earth's surface. For example, service region 197 could be a large geographical region, such as a continent or portion thereof, or could be one or more other (possibly smaller) designated areas, such as an area or location 199 (FIG. 1) within service region 197 (such as a country or portion thereof, or a state or some other geographical area not associated with any particular national, local or legal boundary), or could be a specified area or location 199 that is not part of a larger service region. For convenience, FIG. 3 illustrates satellite footprints 310 as being discrete, generally circular shapes. However, one skilled in the art will understand that in actual practice, the actual shape of the footprints projected in the surface of the earth will vary depending on the satellites elevation angle and beam shape. Moreover, footprint shape is not a critical aspect of the present invention, and the shape of the satellite footprint projected from the satellite could be virtually any shape such as, for example, elliptical, hexagonal, rectangular or square, and the size and shape of overlapping regions footprints also could vary from that depicted in FIG. 3.

In a preferred embodiment of the present invention, FIG. 3 represents a snap shot of dynamically moving satellite coverage areas or footprints at a particular point in time. Where satellites 110 (FIG. 3) are NGSO satellites, satellites 110 will be moving over the surface of the earth, and the coverage areas 195 depicted in FIG. 3 will fall over different geographical regions of the earth over time. Nonetheless, FIG. 3 portrays an overhead view of a multiple coverage over a service region or regions from a satellite perspective at a specified time in the migration path of the satellites 110 shown in FIG. 3.

Figure 4:
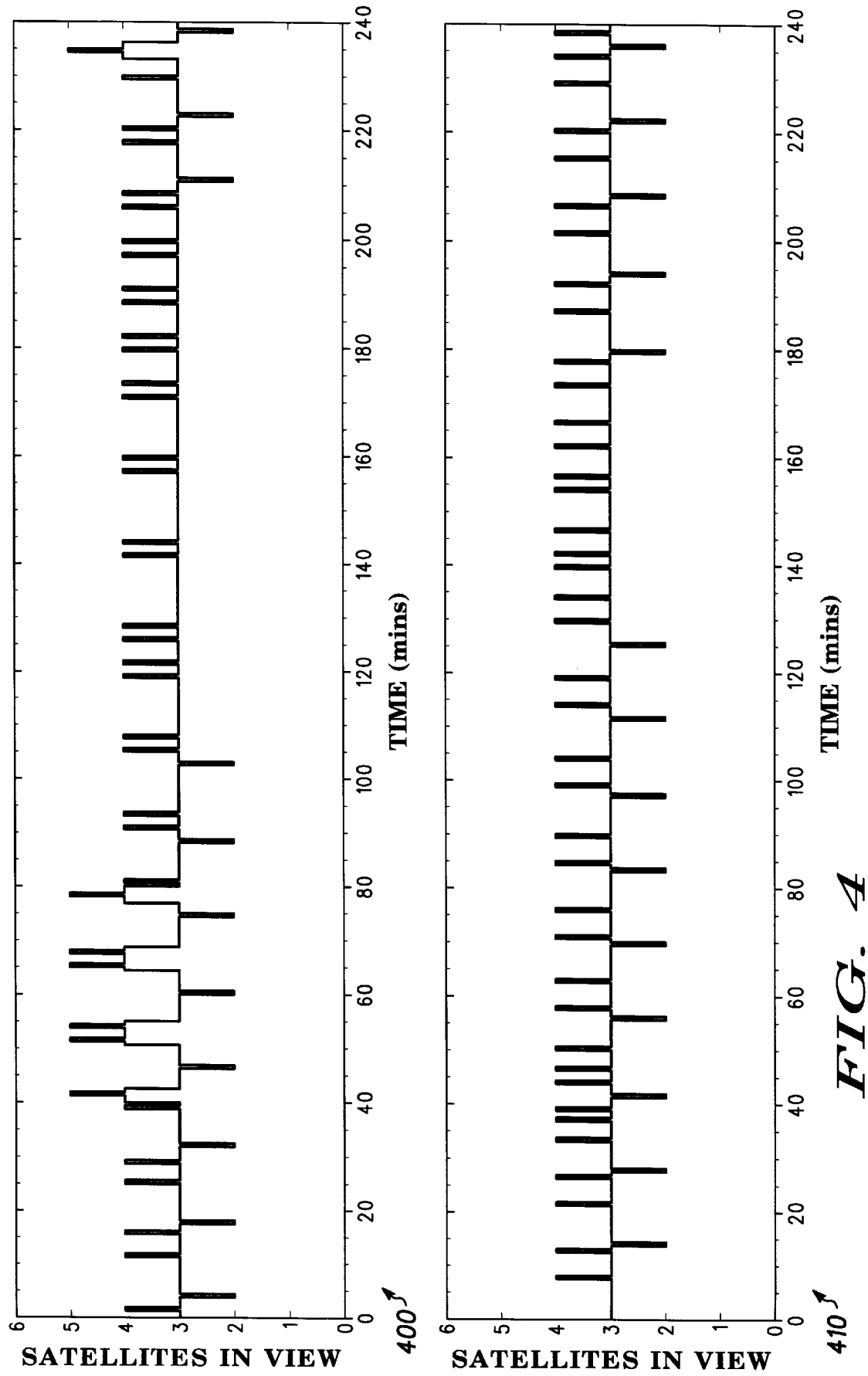
FIG. 4 illustrates a graphical view of multiple satellite coverage of a first and second specified location within a first and second service region.

FIG. 4 illustrates a graphical view of multiple satellite coverage of a first and second specified location within a first and second service region. More specifically, graph 400 of FIG. 4 illustrates, by way of example, the number of satellites that could be in view of a CU (such as CU 140 in FIG. 1) situated in a location, or a service region, or a location that is part of a service region, for example within the vicinity of the City of Denver, Colo. located within a service region of the United States of America over a four hour time period. In this example, and in accordance with a preferred embodiment of the present invention, during a majority of the four hour period, or 73.9% of the time, three satellites would be visible to and capable of (in the absence of any blockage, satellite failure, or other similar occurrence) providing service to CU 140 (and potentially to any CUs situated within the vicinity of the city, or some portion thereof). For the remaining time of the four hour period, two satellites would be visible to and capable of providing service to CU 140 for 4.6% of the time, four satellites would be visible and capable of providing service 19% of the time, and five satellites would be available 2.5% of the time.

Graph 410 of FIG. 4 illustrates a graphical view of multiple satellite coverage of a specified location within a second service region. More specifically graph 410 illustrates, by way of example, the number of satellites that could be in view of a CU (such as CU 140 in FIG. 1) situated, for example within the vicinity of the city of Toulouse, France over a four hour time period. In this example, and in accordance with a preferred embodiment of the present invention, during a majority of the four hour period, or 72% of the time, three satellites would be visible to and capable of (in the absence of any blockage, satellite failure, or other similar occurrence) providing service to CU 140 (and potentially to any CUs situated within the vicinity of the City (or some portion thereof). For the remaining time of the four hour period, two satellites would be visible to and capable of providing service to CU 140 for 11.5% of the time, and four satellites would be visible and capable of providing service 16.5% of the time.

As illustrated in the examples set forth in FIG. 4, satellite diversity is available as a resource for use and allocation to address and/or mitigate various network operational issues, such as augmentation of system capacity, maintenance of service links, service link blockage, and/or satellite failure.

Figure 5:
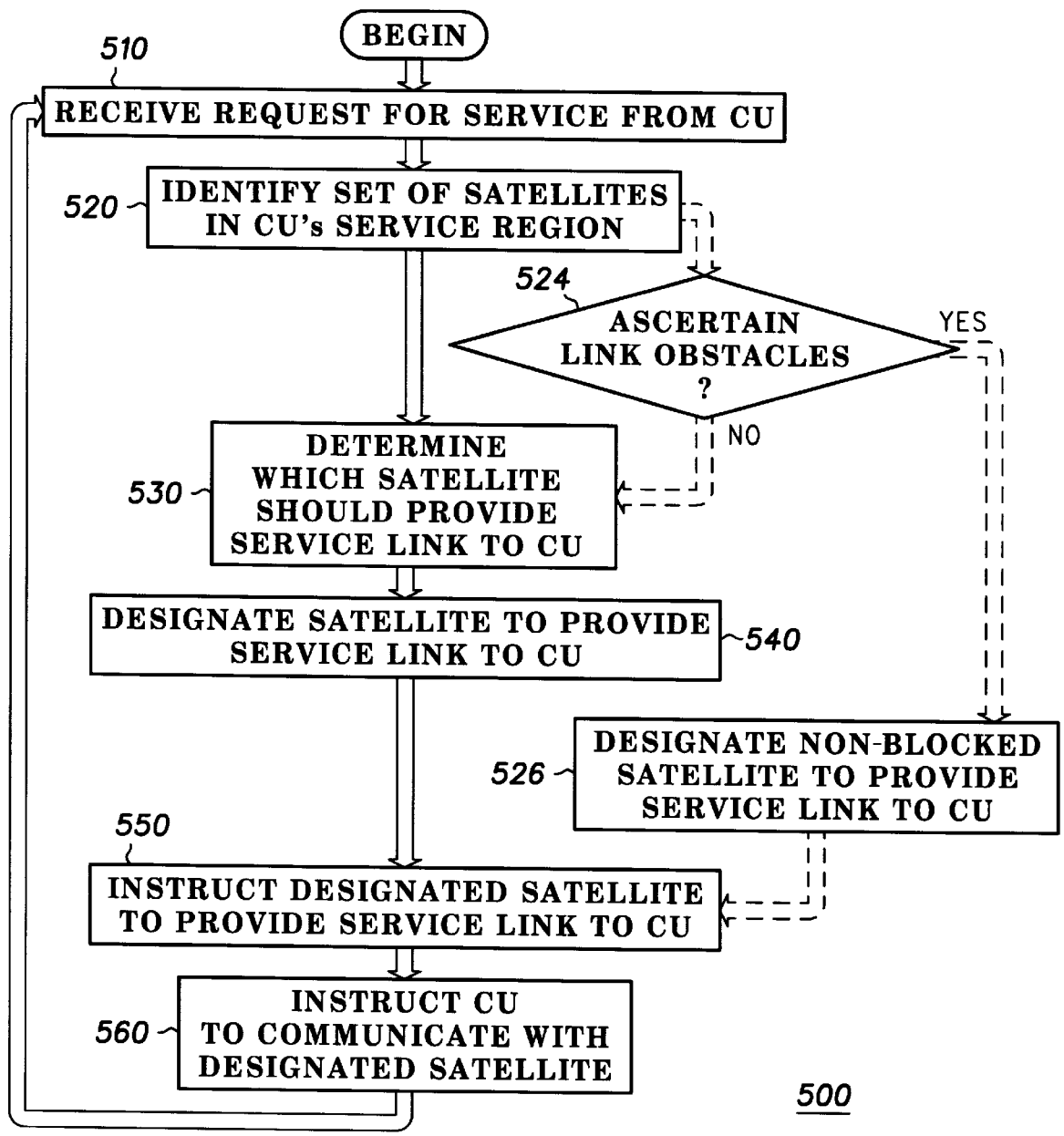
FIG. 5 illustrates a method for managing the resource of satellite diversity in a satellite communication system in accordance with a preferred embodiment of the present invention.

FIG. 5 illustrates a method for managing the resource of satellite diversity in a satellite communication system in accordance with a preferred embodiment of the present invention. Method 500 provides a method for managing satellite diversity to facilitate the maintenance of service links between satellites 110 and CUs 140. In a preferred embodiment, the steps of method 500 are performed by an NCF, such as NCF 130 in FIG. 1, and the method could take place, at least in substantial part, during call set-up (e.g., when a CU requests service from the system). In alternate embodiments, however, method 500 could be performed by other nodes of system 100 (FIG. 1) and could be performed by a combination of more than one node.

Method 500 begins in step 510 when the system receives a request for service from a CU, such as CU 140. Upon receiving the request for service, the system (preferably by NCF 130 working in combination with CU 140) can determine the location of requesting CU 140 through location determining techniques known in the art. In a preferred embodiment, CU 140 sends its location to an NCF, such as NCF 130 (FIG. 1). CU 140 can determine its location using any commonly established location technique, such as geolocation, for example.

In step 520, the system identifies a set of satellites, the set of satellites being comprised of at least two satellites, having coverage areas which correspond, at least in part, with the location of the requesting CU. For example, referring to FIG. 1, if one or more of CUs 140 is/are the requesting CU, the system could determine that any two or more of a set of multiple satellites, which in FIG. 1 could include three satellites 110, has a coverage area 195 (FIG. 1) which corresponds to the location of the requesting CU. Thus, with reference to FIG. 1, because all three satellites 110 depicted in FIG. 1 have a coverage area 195 which corresponds with the location of each CU 140 depicted in FIG. 1, all three satellites could be included in the set of satellites. In FIG. 1, each of the satellites 110 depicted also has a coverage area which corresponds to the service region 197 (which includes the location of each CU 140 in FIG. 1); thus, the coverage area 195 of each satellite 110 also would correspond with a specified service region, namely service region 197.

In step 530, the system determines which satellite of the set of satellites should provide a service link 180 to the CU 140 so that the system can provide service to CU 140. As illustrated in FIG. 1, multiple satellites could provide a service link to CU 140 because CU 140 falls within an overlapping coverage area of all three satellites 110 depicted in FIG. 1. In a preferred embodiment, however, the system will not determine that all three satellites should provide service to CU 140; rather, the resource of satellite diversity created by virtue of the potential to provide multiple coverage will be allocated such that only one satellite of the multiple satellites will actually provide the service link (i.e., will actively communicate with the CU at a given time), with the possible exception that during hand-off conditions, more than one satellite may provide a service link to the same CU to ensure that a new service link is made in the gaining satellite before the service link with the losing satellite is broken. Unlike prior art systems, however, as a general rule, only one satellite at a time could provide a service link to CU 140 even though more than one satellite at a time will provide a service link to CU 140 during non-hand-off conditions. During "hand-off conditions" a first satellite currently providing a service link to a CU needs to hand-off service to the CU to a second satellite because the first satellite is moving out of the line of view of the CU and will no longer be able to provide the service link. Thus, under these limited conditions, there could be occasions when the system will have more than one satellite providing a service link to one CU to establish a "make-before-break" connection that ensures a communication between the CU and the system will not be lost as the losing satellite (i.e., the satellite moving out of the line of view of the CU) hands-off service of the CU to a gaining satellite (i.e., a satellite moving that has been designated to service the CU in accordance with step 540 discussed below, during and after the hand-off takes place).

In a preferred embodiment, the system will, in step 530, apply a predetermined serving strategy, or possibly a combination of predetermined serving strategies to determine which satellite should provide the service link to CU 140. Such serving strategies could range from relatively simplistic strategies to relatively complex strategies. For example, the predetermined serving strategy could identify the highest satellite in the sky capable of providing the service link to CU 140 and instruct the highest satellite in the sky to provide the service link. Numerous alternative strategies also could be applied either uniformly throughout the system or non-uniformly by region or by time or other factors. For example, serving strategies could be developed to simplify hand-offs between satellites or to maximize hand-off opportunities, assist in load balancing and provide a significant flexibility in the system and allows the system to adapt to changing needs and load demands without necessarily adding or subtracting physical elements from the system. Application of alternative serving strategies also can dramatically improve quality of service from the system and optimize the ability of the system to provide and maintain service links under favorable conditions.

Next, in step 540, the system designates a first satellite (also referred to as the designated satellite) of the set of satellites to provide the service link to the communication unit. Then, in step 550, the system sends a signal to the first (designated) satellite instructing the first satellite to provide the service link to CU 140. The designated satellite will then receive the instruction to provide the service link, and will configure its communication resources to provide the service link. The designated satellite will then send its signal to CU 140 in an effort to provide the service link to CU 140.

In step 560, in a preferred embodiment, the system will also send a signal to CU 140 instructing CU 140 to communicate with the first (designated) satellite. CU 140 will receive the instruction and configure its communication resources to accept the service link and begin communicating with the designated satellite.

In an alternate embodiment, steps 520 through 550 could be performed in whole or part by CU 140. CU 140 could be configured to include software and hardware that would allow it to identify the satellites within a communication range to provide a service link to CU 140 (e.g., satellites within a line of view of CU 140, or satellites that would be within a line of view of CU 140 but for some obstacle). CU 140 could then, in step 530, determine which satellite should provide the service link itself (by applying one or more serving strategies as discussed above) or it could make this determination in cooperation with an NCF, such as NCF 130. Once the system (either through CU 140 alone or in combination with NCF 130) determines which satellite should provide the service link, NCF 130 or CU 140 could designate a satellite to provide the link and the designation could be communicated to the other component (e.g., if NCF 130 makes the designation, it could send designation information and or data to CU 140, and if CU 140 makes the designation, it could send designation information to CU 140). NCF 130 then could instruct the designated satellite to provide the service link to CU 140. In this alternative embodiment, CU 140 could then communicate with the designated satellite without necessarily receiving an instruction from NCF 130, thus step 560 could be unnecessary.

Method 500 is an iterative process that can be performed sequentially as additional CUs request service from the system. Thus, after step 560, the system could process the next CU requesting service from the system, and the method would begin again in step 510 for the next CU. In a satellite communication system where many system users request service at the same time, method 500 can be used to process numerous CUs requesting service simultaneously (or within very limited time frames) at the same time.

In another embodiment, method 500 could be adapted to include steps of a method to mitigate the effect of obstacles or blockage between a CU, such as CU 140 and a satellite. In this alternative embodiment of method 500, step 524 comprises ascertaining whether a link obstacle exists between the communication unit and one or more satellite of the set of identified in step 520. A link obstacle could be any obstacle blocking a satellite that otherwise is within a communication range of CU 140 from a line of view or sight of CU 140. Such an obstacle could be, for example, a tree, or other naturally occurring object, or could be a man made object such as a building, or could be a weather related obstacle such as precipitation that hampers the ability of a particular satellite to provide a link to CU 140. Step 524 could be performed by CU 140 or by CU 140 in communication with NCF 130. Step 524 could be performed during call set up as discussed above or could be performed after CU 140 is already communicating with the system if a link obstacle develops between the designated satellite and CU 140 during a communication. In either case, once the system ascertains a link obstacle between a satellite of the set of satellites identified in step 520 and CU 140 in this alternative embodiment, the system, in step 526, could then designate a non-blocked satellite of the set of satellites to provide the service link to CU 140, and the system could then, in step 550 instruct the designated (non-blocked) satellite to provide the service link. Note that steps 524 and 526 are not necessary steps in the execution of method 500 but can be used in an alternative embodiment of method 500 to mitigate the effects on the system of blockage by one or more obstacles.

Figure 6:
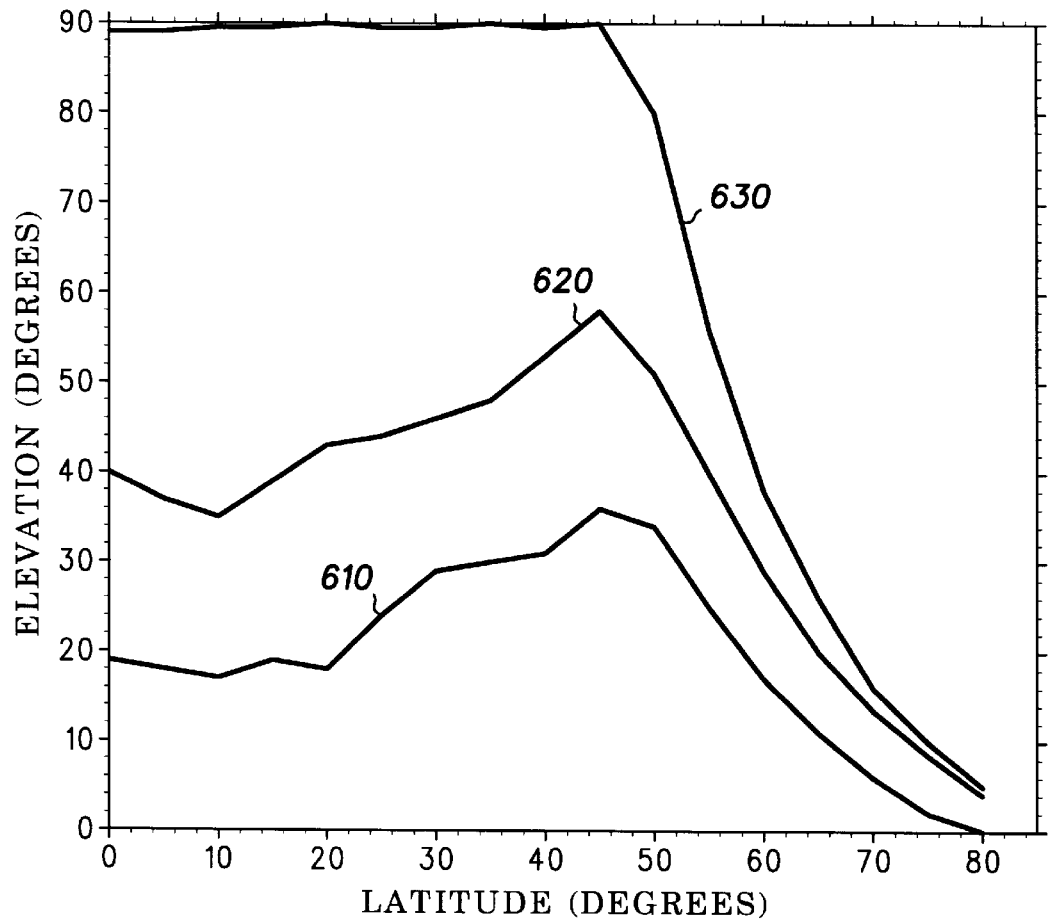
FIG. 6 illustrates a graphical depiction of link maintenance enhancement obtained using the method illustrated in FIG. 5 in the satellite communication system of the preferred embodiment of the present invention.

FIG. 6 illustrates a graphical depiction 600 of link maintenance enhancement obtained using the method illustrated in FIG. 5 in the satellite communication system of the preferred embodiment of the present invention. In a preferred embodiment a (7×9) satellite constellation (i.e., a 63 satellite constellation having nine satellites in each of seven orbital planes) is employed, and the serving strategy applied as discussed in accordance with step 530 of method 500 is the serving strategy of selecting the highest satellite in the sky to provide the service link. The design minimum elevation angle 610 for the (7×9) satellite constellation of the preferred embodiment is 16.13°. The actual service elevation angle that can be seen by a system user as a result of allocating system diversity through a serving strategy which selects the highest satellite in the sky to provide the service link is significantly higher than the design minimum elevation angle 610, as shown in FIG. 6.

As illustrated in FIG. 6, by applying this serving strategy, the median service elevation angle 620 actually encountered is below 40° only in a very small band of latitude near the equator. Throughout the rest of the coverage area of the system, the median service elevation angle 620 is above 40° except in the very Northern and Southern boundaries of the coverage area where the elevation angle tapers off. The maximum potential service elevation angle in various latitudes is represented by line 630. The ability to select a satellite that can be seen from a relatively high service elevation angles through application of a particular serving strategy is one factor of various factors relating to satellite geometry which can, in conjunction with other factors, markedly improve the ability of the system to maintain dynamic service links between satellites and CUs in a satellite communication system as the likelihood of encountering link obstacles decreases substantially when satellites in view through higher service elevation angles are available.

Figure 7:
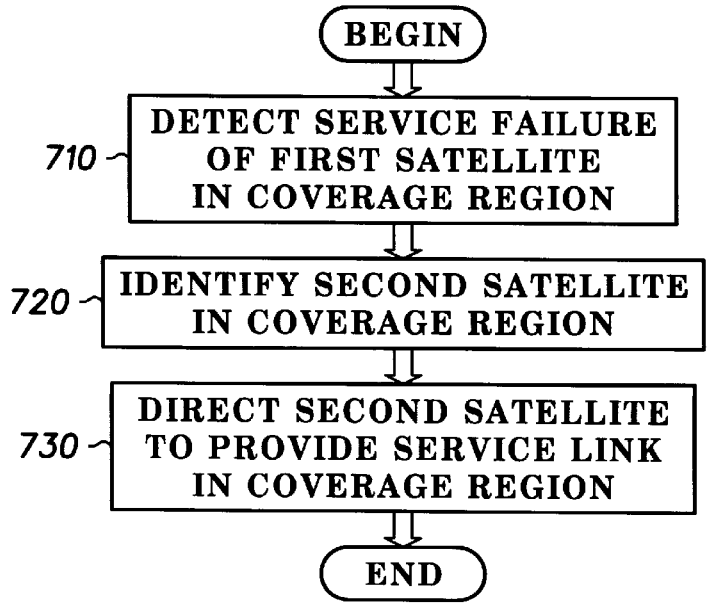
FIG. 7 illustrates a method for mitigating the effect of satellite failure in a satellite communication system in accordance with an alternate embodiment of the present invention.

In an alternate embodiment of the present invention, the resource of satellite diversity also can be used to mitigate the effects of satellite failure in a satellite communication system. FIG. 7 illustrates a method for mitigating the effect of satellite failure in a satellite communication system in accordance with an alternate embodiment of the present invention. In a preferred embodiment, method 700 is executed by one or more NCFs such as NCF 130 (FIG. 1). In alternate embodiments, however, method 700 could be executed by CUs 140, or by one or more satellites 110, or a combination of system nodes.

Method 700 begins in step 710 when the system detects a service failure of a first satellite of the constellation in a service area of the constellation. In a preferred embodiment, the first satellite will be one of multiple satellites in a set of satellites each having a communication range, or a coverage area which overlaps in some part with the communication range of the coverage area of the first satellite. In step 710, the service failure could be detected in any of numerous ways, which could include not only an NCF detecting the failure in accordance with continual or periodic monitoring procedures, but also could include a CU detecting the failure when a CU is communicating with the first satellite when the failure occurs. Conceivably, the first satellite also could be programmed to detect a service failure itself and communicate that failure to one or more other components or nodes of the system.

Next, in step 720, the system will identify a second satellite in the set of satellites that is capable of providing a service link to one or more communication units located within the communication range or coverage area of the first satellite to provide a service link to one of the one or more communication units previously communicating with the first satellite. Step 720 could involve the application of one or more serving strategies as discussed above with respect to step 530 of method 500.

In step 730, once a second satellite is identified to provide one or more service links, the system will direct the second satellite to provide one or more service links to one or more of the communication units that was communicating with the first satellite before the failure. The second satellite will then configure its communication resources to provide the service link and will provide the service link, and the CU will communicate through the service link provided by the second satellite. If the second satellite is not able to provide service to all CUs that were communicating with the first CU before the failure for any reason (e.g., one or more CUs is not located within a coverage area of the second satellite, or a blockage exists between one or more CUs and the second satellite, or the applicable serving strategy suggests the use of a satellite other than the second satellite), then a third satellite of the set of satellites may be instructed to provide a service link to one or more of the CU's located within the coverage area of the first satellite.

Figure 8:
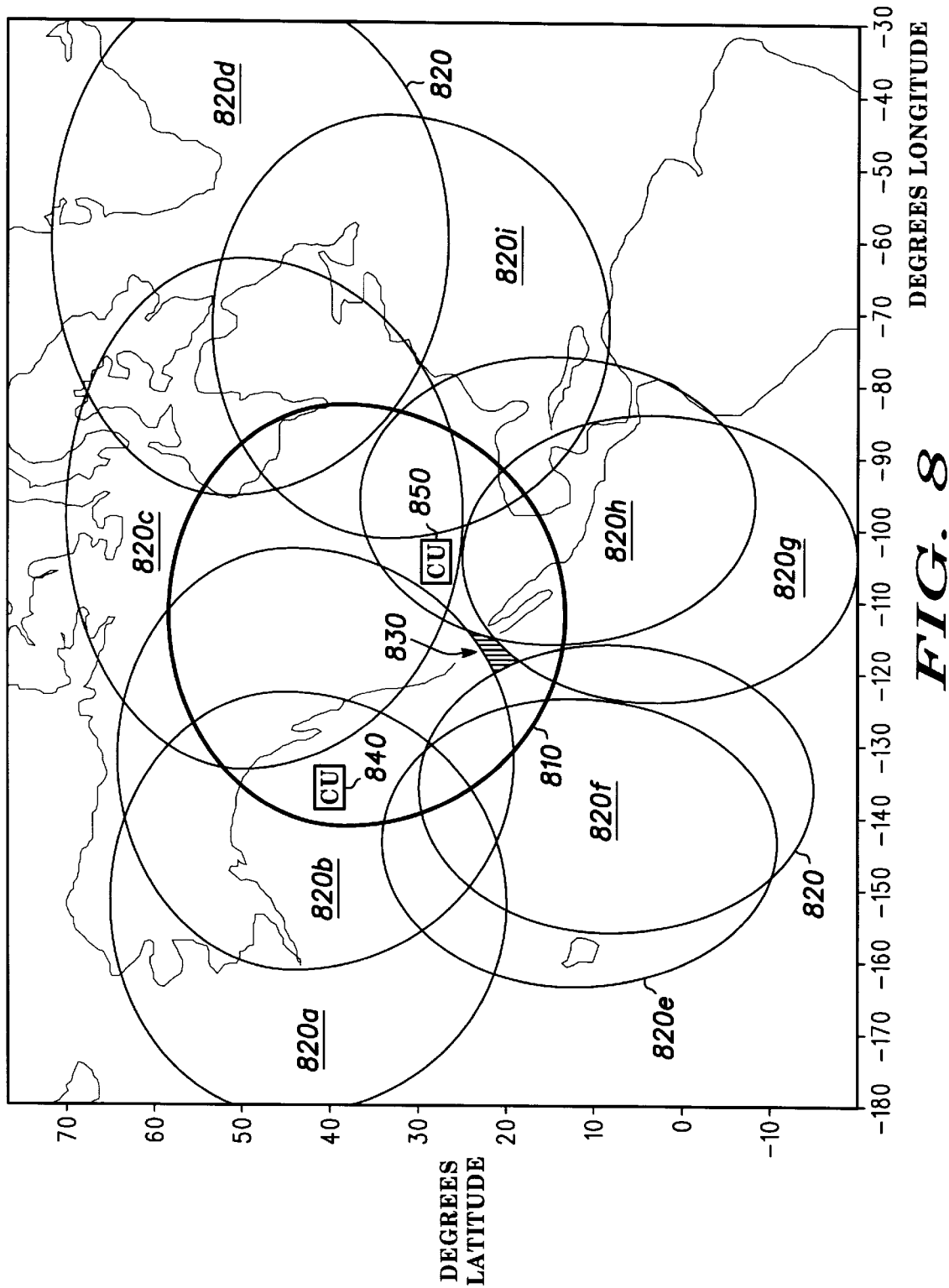
FIG. 8 illustrates a schematic view of the impact of failure of one satellite in the coverage of overlapping satellite footprints of RF beams covering a service region in accordance with a preferred embodiment of the present invention.

In another embodiment of the present invention, the resource of satellite diversity can be allocated to mitigate the effects of satellite failure in a satellite communication system. Use of satellite diversity to mitigate satellite failure provides a vast improvement over prior art satellite mitigation methods. FIG. 8 illustrates a schematic view of the impact of failure of one satellite in a coverage area of overlapping satellite footprints of RF beams covering a service region in accordance with a preferred embodiment of the present invention. In a preferred embodiment of the present invention, the satellite footprints 820 of radio beams illustrated in FIG. 8 are dynamic in nature and would be moving around the surface of the earth in accordance with the direction of motion of the satellite providing each footprint. Thus, FIG. 8 represents a snap-shot of a pattern of coverage area footprints over a region of the earth at first time. In a preferred embodiment, this pattern of coverage area footprints will change over time in accordance with the movement of the satellites. In alternate embodiments, earth-fixed beams could be used.

In FIG. 8, each elliptical depiction represents a coverage area which corresponds to a communication range of a satellite. In FIG. 8, the satellite (not shown) having a coverage area corresponding with coverage area 810 has failed. Thus, coverage area 810 is not receiving service from the satellite that previously provided a satellite footprint of RF beams to coverage area 810. As illustrated in FIG. 8, however, numerous coverage areas or footprints provided by other satellites simultaneously situated over the same general region of the earth are provided in this region, and nine other satellite footprints 820 having coverage areas 820a–i, that overlap, at least in some part, with coverage area 810. Thus, CUs communicating through service links previously provided through the failed satellite corresponding with coverage area 810 can, through use of satellite diversity, be serviced by one or more other satellites having coverage areas overlapping with coverage area 820.

For example, first CU 840 located in an overlapping coverage region between coverage areas 810 and 820b could be reassigned to communicate with the satellite corresponding to coverage area 820b in the event of a failure of the satellite providing service in coverage area 810. Similarly, second CU 850 located in an overlapping coverage region between coverage areas 810, 820b, 820c, 820h, and 820i could be reassigned to communicate with any one of four satellites providing coverage areas 820b, 820c, 820h, or 820i in the event of a failure of the satellite providing service in coverage area 810. At the particular moment in time, only one very small region, darkened region 830, would be outside of a communication range of any satellite other than the satellite providing coverage area 810, and at the moment captured in FIG. 8, the location associated with region 830 is a location in the Pacific Ocean, where the likelihood of ongoing communication between a CU and a satellite at the moment when region 830 is not within a coverage area of another satellite extremely low. In the constellation described with reference to the preferred embodiment above, the existence of regions such as region 830 where multiple coverage would not necessarily be available to mitigate the effects of a failed satellite would be very minimal and generally would occur near the poles in very sparsely populated areas.

Figure 9:
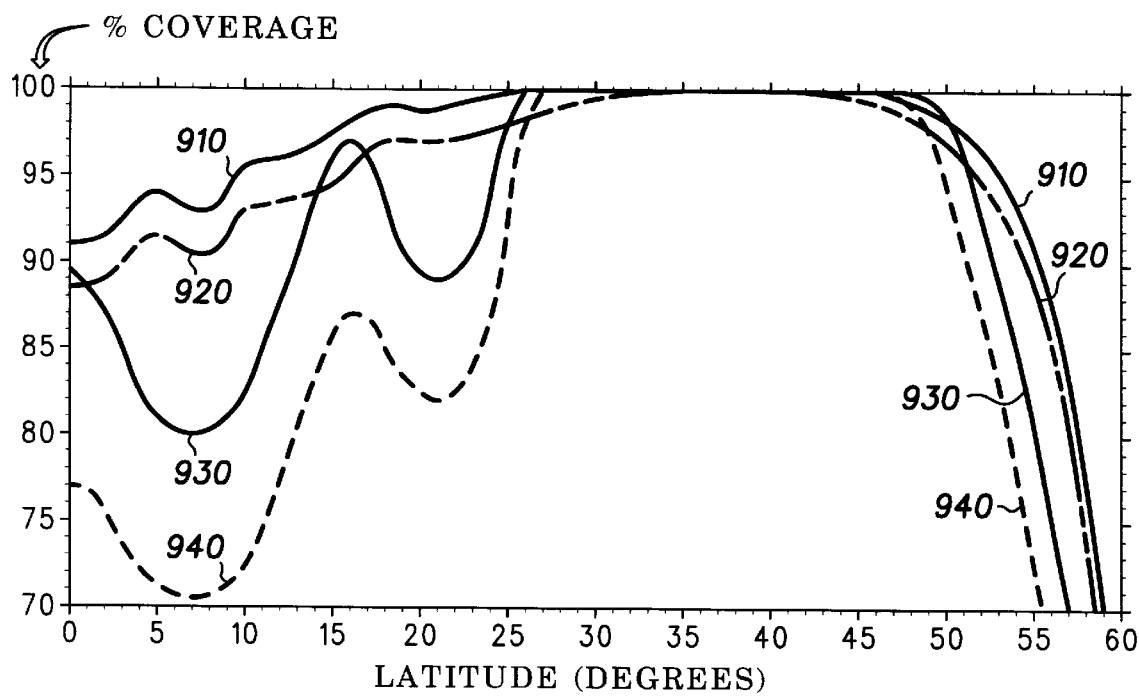
FIG. 9 illustrates a graphical view of the impact of failure of one satellite in a preferred embodiment and alternate embodiment of the present invention.

FIG. 9 illustrates a graphical view of the impact of failure of one satellite in a preferred embodiment and alternate embodiment of the present invention. Line 910 illustrates the expected level of coverage of various service area latitudes of a sixty three satellite, (7×9) constellation in accordance with a preferred embodiment of the present invention with the percentage of coverage shown in relation to varying service area latitudes under normal operating conditions. Line 920 illustrates the effect on the percent of coverage in those same service area latitudes when 1 satellite of the constellation has failed. As illustrated, the failure of one satellite has very little effect on the overall percentage of coverage in most service area latitudes, with the maximum effect, which is less than a 3% decrease in overall coverage, occurring primarily in the 0° to 25° service latitude range.

As also shown in FIG. 9, the (7×9) constellation of the preferred embodiment of the present invention, even with one failed satellite, still has a higher percentage of overall coverage in many latitudes than a fully operational (9×7) constellation of the alternate embodiment, having coverage areas depicted by lines 930 and 940. As illustrated in FIG. 6, although the (9×7) constellation includes the same number of satellites as the (7×9) constellation, the plane arrangement and orbit plane phasing of the two constellations produces different coverage characteristics, which in the case of the (9×7) constellation are not as favorable as in the case of the (7×9) constellation.

Figure 10:
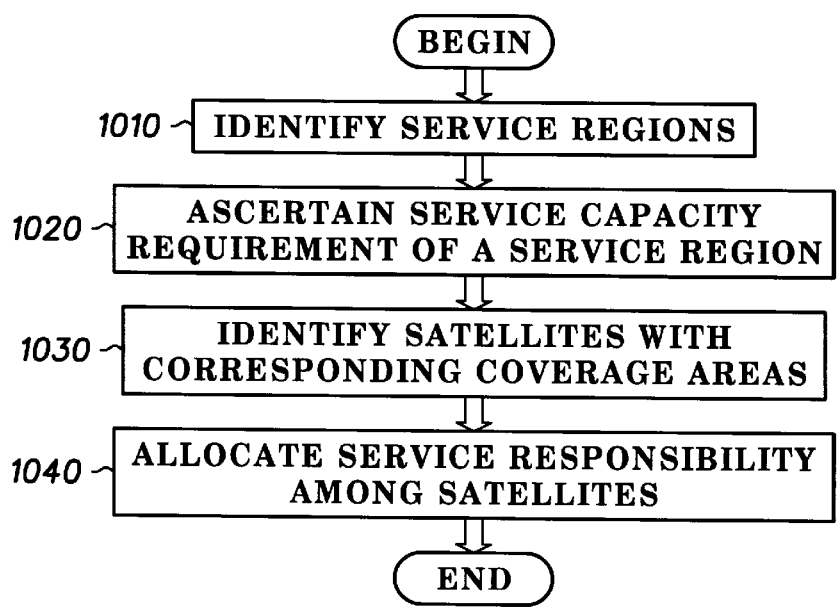
FIG. 10 illustrates a method for augmenting capacity in a satellite communication system in accordance with a preferred embodiment of the present invention.

FIG. 10 illustrates a method 1000 for augmenting capacity in a satellite communication system in accordance with a preferred embodiment of the present invention. Capacity augmentation can be used to provide extra capacity to certain regions during times of peak demand on system resources in a first service region, then to redistribute that capacity to other regions once the increased demand wanes in the first region and peaks in a second region at a second time. Method 1000 also can be used to reallocate service (e.g., in terms or type, quantity, and/or other factors) to one or more developing regions that may not have been known or may have demanded minimal resources when the system was first deployed but have demonstrated increased demand over time.

In a preferred embodiment, method 1000 is carried out in one or more NCFs such as NCF 130. In alternate embodiments, however, method 1000 could be carried out in one or more network nodes other than NCF 130 or could be carried out with the cooperation of NCF 130 and one or more other nodes in the system. The method begins in step 1010 when the system identifies a one or more service regions within a coverage area of the satellite constellation (e.g., satellite constellation 120 of FIG. 1). In step 1020, the system will then ascertain the service capacity requirement of one or more of the identified service regions at one or more times (wherein the times for which service capacity requirements are ascertained could be times within 24 hour cycles and/or other cyclical time periods such as weekly, monthly, or seasonal time periods) through techniques known to those of skill in the art.

In step 1030, the system will then identify one or more satellites having a communication range or geographic coverage area which corresponds at least in part to a geographic location of the first service region. More specifically, the system can identify satellites that could provide service to at least a portion of the one or more service regions during the relevant time in question. Then, in step 1040, the system can allocate responsibility for satisfying the service capacity requirements for the first service region at the first time among the satellites identified in step 1030 in accordance with a responsibility allocation method.

A responsibility allocation method could, for example, comprise the steps of determining a minimum number of satellites of the satellites identified in step 1030 needed to meet the service capacity requirement for the first service region, and then actively employing no more than the minimum number of satellites needed to meet the service capacity requirement for the first service region. Alternatively, the responsibility allocation method could comprise providing a first service level through a plurality of satellites in the system during a first time when demand for service is relatively high, and providing a second service level during a second time when demand for service from the system is relatively low.

Desirably, method 1000 could be employed continually and could be used to allocate service responsibility in more than one and desirably in numerous service areas as demands vary over time and by geographic region, and more than one responsibility allocation method could be used to allocate service responsibility at the same or different times as desired.

Figure 11:
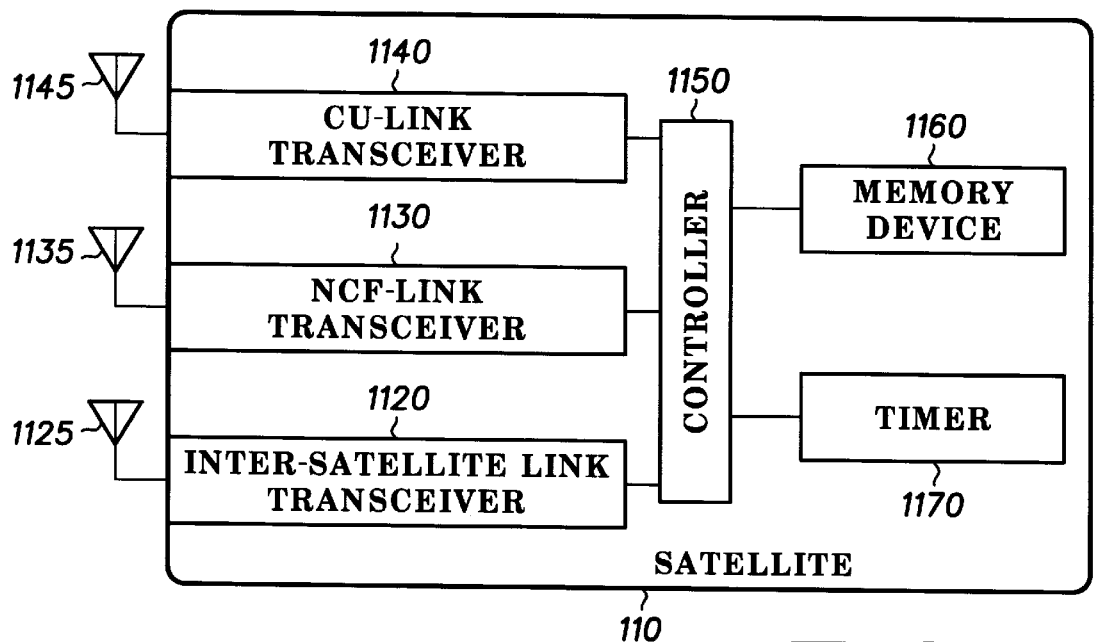
FIG. 11 illustrates a simplified block diagram of a satellite in accordance with a preferred embodiment of the present invention.

FIG. 11 illustrates a simplified block diagram of a satellite in accordance with a prefered embodiment of the present invention. With reference to FIG. 1, preferably all satellites, such as satellite 110 (FIG. 1), within system 100, include equipment as illustrated. In a preferred embodiment of the present invention, satellite 110 includes inter-satellite link transceivers 1120 and associated antennas 1125. Transceivers 1120 and antennas 1125 support inter-satellite links to nearby satellites, such as satellites 110 (FIG. 1). NCF link transceivers 1130 and associated antennas 1135 support communications with NCFs, such as NCF 130 (FIG. 1). CU-link transceivers 1140 and associated antennas 1145 support communication with CUs 140 (FIG. 1) and provide the service link between the satellite and a CU. Preferably, each satellite could simultaneously support links for numerous CUs . Those skilled in the art will appreciate that antennas 1125, 1135, and 1145 could be implemented either as single antennas or as banks of discrete antennas. NCF link transceiver 1130 includes a receiver capable of receiving an instruction from a NCF to provide a service link to communicate with a CU in an overlapping coverage region of multiple satellites.

Controller 1150 couples to each of transceivers 1120, 1130, and 1140 as well as to memory device 1160. Controller 1050 could be implemented using one or more processors. Such processor could process the instructions and could, alone or in conjunction with other elements in controller 1150 allocate resources in the satellite to provide the service link, and could ensure that the service link provided does not interfere with other service links provided to a CU when the CU resides in an overlapping coverage region of more than one satellite. Memory device 1160 (e.g., random access memory or RAM, other semiconductor or magnetic read-write memory devices, optical disk, magnetic tape, floppy disk, hard disk, etc.) stores data that serve as instructions to controller 1150 and that, when executed by controller 1150, cause satellite 110 to carry out various procedures. In addition, memory device 1160 includes variables, tables, and databases that are manipulated during the operation of satellite 110. Memory device 1160 also could be used to store information regarding locations of CUs 140 (FIG. 1) in system 100 (FIG. 1), and to service responsibility allocations, directions concerning CU support, and/or other directions or commands received from one or more NCFs or CUs. Controller 1150 also couples to one or more timers 1170 which can be used, among other things to maintain current date and time information.

CU-link transceiver 1140 desirably includes one or more multi-channel transceivers capable of transmitting and receiving data on different selectable frequencies during particular, selectable time slots as directed by controller 1150. More specifically, CU-link transceiver 1140 includes a receiver for receiving instructions from an NCF and/or a CU to provide a service link to communicate with a CU in an overlapping coverage region. CU-link transceiver 1140 also includes a transmitter for providing one or more service links between the satellite and one or more CUs. CU-link transceiver 1140 contains multi-channel radios having a sufficient number of channels to provide the desired number of transmission and reception frequencies for signal access and control and for the user voice and/or data. Controller 1150 could provide for allocation of channel assignments, cell-to-cell hand-offs, and other overhead and management and control functions. CU-link transceivers 1140 desirably provide for transmission and reception on any channel so that each CU-link transceiver 1140 could, if needed, utilize the entire spectral capacity allocated to the system for all channels by having the capability to handle all channel assignments.

Figure 12:
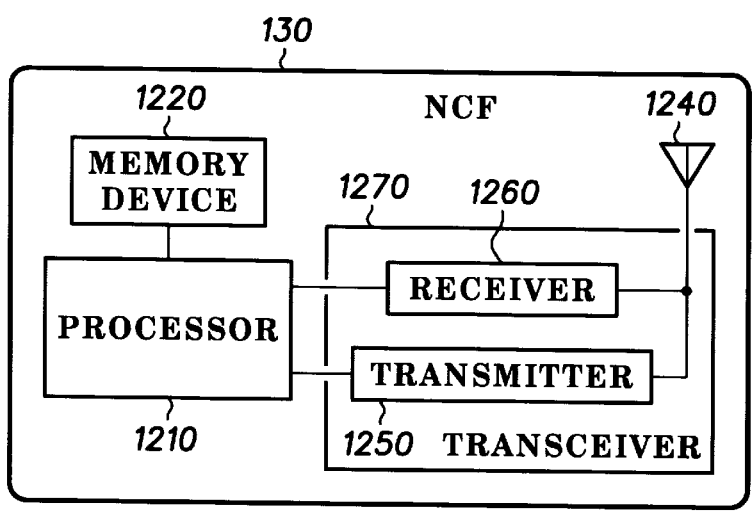
FIG. 12 illustrates a simplified block diagram of a network control facility in accordance with a preferred embodiment of the present invention.

FIG. 12 illustrates a simplified block diagram of an NCF, such as NCF 130, in accordance with a preferred embodiment of the present invention. NCF 130 includes at least one processor 1210 coupled to associated memory device 1220 (e.g., random access memory or RAM, other semiconductor or magnetic read-write memory devices, optical disk, magnetic tape, floppy disk, hard disk, etc.). NCF 130 also includes antenna 1240 coupled to transmitter 1250 and receiver 1260 of transceiver 1270. Transmitter 1250 and receiver 1260 are coupled to processor 1210. Receiver 1260 is adapted to receive requests for service from CUs located within various service regions, including overlapping coverage regions of multiple satellites.

Processor 1210 desirably carries out procedures exemplified above and described in the associated text. Processor 1210 desirably includes capacity augmentation means for predicting variations in satellite coverage areas in each service region at any particular time and for directing satellites to communicate with specific communication units located within the coverage area of each satellite such that more than one satellite will not actively communicate with the same communication unit at the same time during the non-hand-off conditions. Processor 1210 also preferably includes channel assignment devices, location determining devices, and one or more devices for identifying and determining which satellite of multiple satellites available to provide service to a particular service region and or to provide a service link to a CU in a particular location, such as, for example, in an overlapping coverage region of multiple satellites, should provide the service or the service link and for designating and/or instructing such satellite to provide the service and/or the service link. Additionally, processor 1210 preferably is capable of applying a serving strategy for determining which satellite of multiple satellites capable of providing a service link to a communication unit in a service region should be designated to provide the service link to the communication unit at a particular time. Processor 1210 also is desirably and capable of assigning one satellite of the multiple satellites capable of providing service to provide the service link to the communication unit.

Processor 1210 also desirably executes and evaluates procedures such as serving strategies and/or allocation methods as described above. Processor 1210 further desirably includes detecting means for detecting a service failure of a first satellite of the satellite constellation, and directing means for directing a second satellite having a coverage area that overlaps at least in part with a coverage area of the first satellite to provide service to at least one communication unit previously receiving service from the first satellite.

In addition to performing other tasks as appropriate, processor 1210 desirably stores results from such procedures in memory device 1220. For example, processor 1210 desirably stores data and/or information relating to serving strategies and allocation methods discussed above in memory device 1220. Transmitter 1250 and receiver 1260 transmit messages to and receive messages from satellites and/or CUs.

Processor 1210 also generally controls and manages system user requests, call set-up, service responsibility allocation, channel allocation, frequency and time slot assignment, and other system communication and control functions. Among other things, processor 1210 desirably executes procedures to allow user access to satellite communication system 100. In alternate embodiments, such functions could be performed by, or with the cooperation of, one or more other system nodes.

Figure 13:
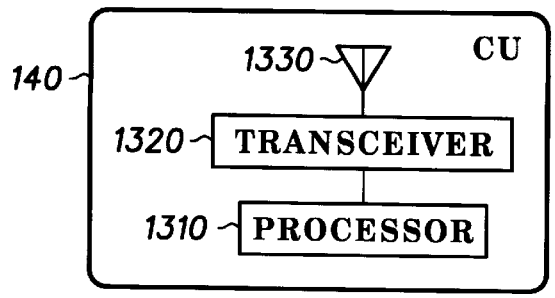
FIG. 13 illustrates a simplified block diagram of a communication unit in accordance with a preferred embodiment of the present invention.

FIG. 13 illustrates a simplified block diagram of a communication unit (CU), such as CU 140, in accordance with a preferred embodiment of the present invention. As noted in conjunction with the discussion of FIG. 1 above, CU 140 could be any one or more of various communication devices in a preferred embodiment of the present invention. For example, CU 140 preferably is a communication device capable of transmitting data and/or voice to, and receiving data and/or voice from, satellites, such as satellites 110. By way of example, CU 140 could be a computer or other device capable of sending and receiving data, e-mail messages, video signals or facsimile signals to name a few. CU 140 also could be a relatively stationary terminal located on, near or in a premises or building, such as a house or a place of business, wherein CU 140 can be configured to receive and/or send signals from or to one or more satellites. Alternatively, CU 140 could be a hand-held cellular telephone adapted to transmit and receive communications from satellites 110 and/or from one or more NCFs such as NCF 130. In an alternative embodiment, a base station, such as base station 150 (FIG. 1) could fulfill the role of communicating with one or more satellites 110 and relaying signals received from satellite 110 to CU 140.

CU 140 includes processor 1310, transceiver, 1320, and antenna 1330. Processor 1310 receives indications from a user interface or computer (not shown) indicating that the CU should make a request for service. Processor 1310 then makes a request for service using transceiver 1320 and antenna 1330. The service request is made to an antenna (e.g., an antenna on a satellite or an antenna on an NCF). Transceiver 1320 communicates through a service beam over a service link provided by a satellite as described in accordance with FIG. 1.

In summary, the present invention provides an improved method, and apparatus, and system for managing communication resources in a satellite communication system. The present invention uses satellite diversity to provide a method and apparatus for providing an economically viable satellite communication system for voice, data, and video. More specifically, the method and apparatus described herein use satellite diversity to augment system capacity and to mitigate network operational issues such as satellite blockage and/or satellite failure, and to optimize the maintenance of service links. The method and apparatus described herein also provide a satellite communication system having flexibility to adapt to changing demand and capacity requirements in various regions of the earth and to unknown or unanticipated changes in demand developing over time after the system has been deployed in whole or part.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

While the present invention has been described above in connection with a specific method and apparatus and with reference to a preferred embodiment, it is to be clearly understood that this description is made only by way of example and not as a limitation on the scope of the invention. Those skilled in the art will recognize that changes and modification could be made in the preferred embodiment without departing from the scope of the present invention. For example, those skilled in the art will recognize that, because controllable processors are located in each of CUs 140, satellites 110, and NCF 130, the processes described above could be distributed differently than indicated. Additionally, although satellite communication system 100 has been described with reference to the earth 210, satellite communication system 100 could be dispersed over, surround and orbit any celestial body without departing from the scope of the present invention. Furthermore, although the satellite communication system of the present invention was described, in a preferred embodiment, with reference to a satellite constellation containing a specified number of LEO satellites in specified planes, the method and apparatus of the present invention could be practiced using satellite constellations of virtually any composition where more than one satellite is involved, and not only with NGSO satellites but also with GEO satellites and/or combinations of NGSO and GSO satellites. These and other modification that are obvious to those skilled in the art are intended to be included in the scope of the present invention.

What is claimed is:

1. A satellite communication system for providing telecommunication services, the satellite communication system comprising:

at least one satellite constellation comprised of a plurality of satellites, each satellite of the plurality of satellites providing a coverage area;

at least one network control facility capable of communicating with the plurality of satellites and of directing activity of the plurality of satellites, the network control facility including:

capacity augmentation means for predicting variations in satellite coverage areas and directing satellites to communicate with specific communication units located within the satellite coverage area of each satellite such that more than one satellite will not actively communicate with the same communication unit at the same time during non-hand-off condition; and a processor capable of applying a serving strategy for determining which satellite of multiple satellites capable of providing a service link to a communication unit in a service region should be designated to provide the service link to the communication unit at a particular time and capable of assigning one satellite of the multiple satellites capable of providing service to provide the service link to the communication unit, wherein the serving strategy is comprised, at least in part, of selecting a highest satellite in the sky from the multiple satellites capable of providing the service link to the communication unit;

one or more communication units, the one or more communication units capable of communicating with the satellite constellation, wherein the one or more communication units are situated within a coverage area of multiple satellites of the plurality of satellites at substantially any time, and wherein, during non-hand-off conditions, each communication unit of the one or more communication units actively communicates with only one satellite of the multiple satellites at any time.

2. The satellite communication system as claimed in claim 1, wherein the at least one satellite constellation is comprised of non-geosynchronous satellites.

3. The satellite communication system as claimed in claim 1, wherein the at least one satellite constellation is comprised of geosynchronous satellites.

4. The satellite communication system as claimed in claim 1, wherein the at least one satellite constellation is comprised of a combination of non-geosynchronous and geosynchronous satellites.

5. The satellite communication system as claimed in claim 1, wherein the at least one satellite constellation is a non-geostationary satellite constellation, wherein the satellites reside in at least seven orbital planes that are inclined at a predetermined inclination angle with respect to an equatorial plane of the earth, and wherein there are at least nine satellites in each orbital plane of the at least seven orbital planes.

6. The satellite communication system as claimed in claim 1, wherein the capacity augmentation means comprises a processor for predicting variations in satellite coverage areas in each service region at any particular time and for directing satellites to communicate with specific communication units located within the coverage area of each satellite such that more than one satellite will not actively communicate with the same communication unit at the same time during the non-hand-off conditions.

7. The satellite communication system as claimed in claim 1, wherein the at least one network control facility includes detecting means for detecting a service failure of a first satellite of the satellite constellation, and directing means for directing a second satellite having a coverage area that overlaps at least in part with a coverage area of the first satellite to provide service to at least one communication unit previously receiving service from the first Satellite.

8. A satellite communication system for providing telecommunication services, the satellite communication system comprising:

at least one satellite constellation comprised of a plurality of satellites, each satellite of the plurality of satellites providing a coverage area;

at least one network control facility capable of communicating with the plurality of satellites and of directing activity of the plurality of satellites, the network control facility including a processor capable of applying a serving strategy for determining which satellite of multiple satellites capable of providing a service link to a communication unit in a service region should be designated to provide the service link to the communication unit at a particular time and capable of assigning one satellite of the multiple satellites capable of providing service to provide the service link to the communication unit, wherein the serving strategy is comprised, at least in part, of selecting a highest satellite in the sky from the multiple satellites capable of providing the service link to the communication unit;

one or more communication units, the one or more communication units capable of communicating with the satellite constellation, wherein the one or more communication units are situated within a coverage area of multiple satellites of the plurality of satellites at substantially any time, and wherein, during non-hand-off conditions, each communication unit of the one or more communication units actively communicates with only one satellite of the multiple satellites at any time.

9. The satellite communication system of claim 8, wherein the serving strategy is comprised, at least in part, of selecting a highest satellite in the sky from the multiple satellites capable of providing the service link to the communication unit.

10. The satellite communication system of claim 8, wherein the serving strategy varies according to the service region currently being serviced by the multiple satellites.

11. The satellite communication system of claim 8, wherein the serving strategy varies according to demands from one or more individual communication units.

12. A method for managing resources in a satellite communication system having at least one satellite constellation comprised of a plurality of satellites, at least one network control facility capable of communicating with the satellites and directing activity of the satellites, and one or more communication units capable of communicating with the at least one satellite constellation, each communication unit of the one or more communication units being located within a coverage area of more than one satellite of the at least one satellite constellation, the method comprising the steps of:

a) receiving a request for service from a first communication unit of the one or more communication units;

b) identifying at least two satellites having coverage areas which correspond, at least in part, with a location of the first communication unit;

c) determining which satellite of the at least two satellites should provide a service link to the first communication unit by applying at least one predetermined serving strategy that determines which satellite of the at least two satellites should provide the service link to the first communication unit and identifies a highest satellite in the sky capable of providing the service link; and d) designating a first satellite of the at least two satellites to provide the service link to the first communication unit for a first period of time by assigning the highest satellite in the sky to provide the service link to the first communication unit.

13. The method as claimed in claim 12, wherein the location of the first communication unit corresponds to a service region.

14. The method as claimed in claim 12, wherein the determining step c) comprises the step of applying at least one predetermined serving strategy to determine which satellite of the at least two satellites should provide the service link to the first communication unit.

15. The method as claimed in claim 14, wherein in the applying step comprises the step of applying the predetermined serving strategy which identifies a highest satellite in the sky capable of providing the service link, and wherein the designating step d) comprises the step of assigning the highest satellite in the sky to provide the service link to the first communication unit.

16. The method as claimed in claim 12, further comprising the step of:

e) instructing the first communication unit to communicate with the satellite designated to provide the service link in the designating step d).

17. A method for managing resources in a satellite communication system having at least one satellite constellation comprised of at least two satellites and one or more communication units, wherein the at least two satellites reside in one or more predetermined orbits, and wherein each satellite has a coverage area which overlaps, at least in part, with the coverage area of another satellite in the satellite constellation, to provide an overlapping coverage region, the method comprising the steps of:

a) receiving a request for service from a communication unit located within the overlapping coverage region of a set of satellites;

b) determining which satellite of the set of satellites should provide a service link to the communication unit in the overlapping coverage region; and c) designating a first satellite of the set of satellites to provide the service link to the communication unit in the overlapping coverage region;

d) instructing the first satellite designated to provide the service link;

e) receiving by the first satellite an instruction to provide the service link;

f) configuring communication resources in the satellite to provide the service link; and g) providing the service link between the first satellite and the communication unit.

18. The method as claimed in claim 17, further comprising the steps of:

d) instructing the first satellite designated in step c) to provide the service e) receiving by the first satellite an instruction to provide the service link;

f) configuring communication resources in the satellite to provide the service link; and g) providing the service link between the first satellite and the communication unit.

19. The method as claimed in claim 18, further comprising the step of:

h) instructing the communication unit to communicate through the service link from the first satellite.

20. The method as claimed in claim 17, wherein the determining step b) further comprises the step of ascertaining whether a link obstacle exists between the communication unit and at least one satellite of the set of satellites, and the designating step c) further comprises the step of, if the link obstacle is ascertained, designating a satellite other than a satellite to which the link obstacle was ascertained to provide the service link.

21. A method for mitigating satellite failure in a satellite communication system having at least one satellite constellation comprised of at least two satellites, and one or more communication units, wherein the at least two satellites reside in one or more predetermined orbits, and wherein each satellite has a coverage area which overlaps, at least in part, with the coverage area of another satellite in the satellite constellation, to provide an overlapping coverage region, the method comprising the steps of:

a) detecting a service failure of a first satellite of the at least one satellite constellation;

b) identifying a second satellite, which is capable of providing a service link to one or more communication units located in the overlapping coverage region, to provide the service link to at least one of the one or more communication units previously communicating with the first satellite; and c) directing the second satellite to provide the service link to the at least one of the one or more communication units without adjusting a relative position of the second satellite in its predetermined orbit.

22. The method as claimed in claim 21, further comprising the steps of:

d) instructing a third satellite, which is capable of providing the service link to the one or more communication units located in the overlapping coverage region which are not communicating with the second satellite, to provide the service link to at least one of the one or more communication units not communicating with the second satellite.

23. A method for augmenting capacity in a satellite communication system using satellite diversity, the satellite communication system having at least one satellite constellation comprised of at least two satellites, wherein the at least two satellites reside in one or more predetermined orbits, and wherein each satellite of the at least two satellites has a coverage area which overlaps, at least in part, with a coverage area of another satellite of the at least two satellites, the method comprising the steps of:

a) identifying a first service region within a service area of the at least one satellite constellation;

b) ascertaining a service capacity requirement for the first service region at a first time;

c) identifying one or more satellites each having a coverage area which corresponds at least in part to a location of the first service region; and d) allocating responsibility for satisfying the service capacity requirement for the first service region at the first time among the two or more satellites in accordance with a responsibility allocation method.

24. The method of claim 23, wherein the responsibility allocation method comprises the steps of:

d1) determining a minimum number of satellites of the one or more satellites needed to meet the service capacity requirement for the first service region; and d2) actively employing, to meet the service capacity requirement for the first service region, no more than the minimum number of satellites of the one or more satellites.

25. The method as claimed in claim 23, wherein the responsibility allocation method comprises providing a first service level through a plurality of satellites when the service capacity requirement is relatively high, and providing a second service level during a second time when the service capacity requirement is relatively low.

26. The method as claimed in claim in claim 23, further comprising the steps of:

e) ascertaining a second service capacity requirement for a second service region at a second time;

f) identifying a plurality of satellites each having a coverage area which corresponds at least in part to a location of the second service region; and g) allocating responsibility for satisfying the second service capacity for the second service region at the second time among the plurality of satellites in accordance with a second allocation method.

27. The communication unit as claimed in claim 26, further comprising: an antenna, coupled to the transceiver, which is adapted to change a direction of the service link in response to instructions from the satellite communication system directing the communication unit to communicate with the first designated satellite such that the service link can be directed to facilitate communications with the first designated satellite through the service link.

28. A communication unit for communicating in a satellite communication system having a satellite constellation including a plurality of satellites, the plurality of satellites including multiple satellites situated within a communication range of the communication unit and able to provide simultaneous service to the communication unit, the communication unit comprising:

a processor for creating a service request and for processing instructions from the satellite communication system directing the communication unit to communicate at a particular time only with a first designated satellite of the multiple satellites situated within a communication range of the communication unit through a service link with the first designated satellite of the plurality of satellites; and a transceiver, coupled to the processor, for sending the service request for receiving the instructions, and for communicating with the first designated satellite through the service link.

29. A network control facility for use in a satellite communication system having at least one satellite constellation comprised of at least two satellites, and one or more communication units, wherein the at least two satellites reside in one or more predetermined orbits, and wherein each satellite has a coverage area which overlaps, at least in part, with the coverage area of another satellite in the satellite constellation to provide an overlapping coverage region, the network control facility comprising:

a receiver for receiving a request for service from a communication unit located within the overlapping coverage region; and a processor, coupled to the receiver, for predicting variations in satellite coverage areas and determining a particular satellite of the at least two satellites having an area of coverage that corresponds, at least in part, to the overlapping coverage region, and for designating only the particular satellite to provide the service link to the communication unit at a particular time such that more than one satellite of the at least two satellites will not actively communicate with the same communication unit at the same time during non-hand-off conditions.

30. A satellite communication system using satellite diversity for augmenting capacity, maintaining service links and mitigating network operational issues including effects of satellite failure and service blockage, the satellite communication system comprising:

at least one satellite constellation comprised of a plurality of satellites, the satellite constellation having a service area, and each satellite of the plurality of satellites providing a coverage area within the service area;

means for communicating with the plurality of satellites and directing activity of the plurality of satellites;

one or more communication units, the communication units capable of communicating with the at least one satellite constellation, wherein the one or more communication units are situated within coverage area of multiple satellites at substantially any time;

means for receiving a request for service from a first communication unit of the one or more communication units situated within the coverage areas of the multiple satellites;

means for determining which satellite of the multiple satellites should provide a service link to the first communication unit, wherein the means for determining includes means for applying a predetermined serving strategy to determine which satellite of the multiple satellites should provide the communication link;

means for designating a first satellite of the multiple satellites to provide the service link to the first communication unit;

means for ascertaining whether a link obstacle exists between the first communication unit and the first satellite;

means for designating a second satellite to provide the service link if the link obstacle exists between the first communication unit and the first satellite;

means for detecting a failed satellite in the satellite constellation;

means for identifying another second satellite capable of providing the service link to the first communication unit previously communicating with the failed satellite and for directing the second satellite to communicate with the communication unit previously communicating with the failed satellite;

means for identifying a first service region within the service region of the satellite constellation;

means for ascertaining a service capacity requirement for the first service region at a first time;

means for identifying the multiple satellites having coverage areas which correspond at least in part to the first service region; and means for allocating responsibility for satisfying the service capacity requirement for the first service region at the first time among the multiple satellites in accordance with a responsibility allocation method.

* * * * *